United States Patent
Wu

(10) Patent No.: US 6,920,125 B1
(45) Date of Patent: Jul. 19, 2005

(54) IP ADAPTATION LAYER ON BACKHAUL CONNECTION OF CELLULAR NETWORK

(75) Inventor: Geng Wu, Plano, TX (US)

(73) Assignee: Nortel Network Limited, St. Laurent (CA)

( * ) Notice: Subject to any disclaimer, the term of this patent is extended or adjusted under 35 U.S.C. 154(b) by 940 days.

(21) Appl. No.: 09/699,196

(22) Filed: Oct. 27, 2000

(51) Int. Cl.$^7$ .............................................. H04Q 7/24
(52) U.S. Cl. ...................... 370/338; 370/352; 370/465; 370/474
(58) Field of Search ................................ 370/401, 437, 370/442, 465, 469, 474, 310.1, 310.2, 328, 329, 336, 338, 341, 345, 352, 353, 354, 392, 393, 395.52, 356, 395.81

(56) References Cited

U.S. PATENT DOCUMENTS

| | | | |
|---|---|---|---|
| 6,049,543 A | * | 4/2000 | Sauer et al. ................. 370/335 |
| 6,230,012 B1 | * | 5/2001 | Willkie et al. ............ 455/435.1 |
| 6,233,458 B1 | * | 5/2001 | Haumont et al. ............ 455/445 |
| 6,396,828 B1 | * | 5/2002 | Liu .............................. 370/352 |
| 6,701,361 B1 | * | 3/2004 | Meier .......................... 709/224 |
| 6,751,207 B1 | * | 6/2004 | Lee et al. .................... 370/338 |

OTHER PUBLICATIONS

Subbiah, Baranitharn, Method and Apparatus for Providing User Multiplexing in a Real–Time Protocol, International Publication No. WO 00/11849, Mar. 2, 2000.
Subbiah, B. and S. Sengodan, "User Multiplexing in RTP Payload Between IP Telephony Gateways," IETF, Feb. 21, 1999.
El–Khatib, K. and G. Bochman, "Multiplexing Scheme for RTP Flows Between Access Routers," IETF, Dec. 24, 1999.
Hoshi, Tohru, "Voice Stream Multiplexing Between IP Telephony Gateways," IEICE Trans, Apr. 1999.
Perkins, Charles E.; "Tutorial: Mobile Networking Through Mobile IP;" Jan. 1998; IEEE Internet Computing.
Perkins, C.; "RFC 2002: IP Mobility Support;" Oct. 1996; Network Working Group.
La Porta, Thomas F., Luca Salgarelli and Gerald T Foster; "Mobile IP and Wide Area Wireless Data;" 1998; IEEE Internet Computing.
Simpson, W.; "RFC 1853: IP in IP Tunneling;" Oct. 1995; Network Working Group.
Perkins, C.; "RFC 2003: IP Encapsulation within IP;" Oct. 1996; Network Working Group.

* cited by examiner

*Primary Examiner*—Phirin Sam
(74) *Attorney, Agent, or Firm*—Hemingway, LLP; D. Scott Hemingway; Malcolm W. Pipes

(57) ABSTRACT

The present invention relates to an improved wireless communications system capable of efficiently transmitting smaller-sized data packets (e.g. 10 to 20 byte length) that are frequently delivered (e.g. every 10 to 20 msec.) to mobile nodes on the communications system, such as voice communications. Because an uncompressed TCP/IP or UDP/IP header length is disproportionally large compared to the smaller-sized data packets, the bandwidth on the backhaul connection between the base station controller unit (BSC) and the base transceiver station (BTS) is not being utilized as efficiently as possible. The present invention optimizes the transmission of information packets on the backhaul connection by using an IP Adaptation Layer (IPAL) protocol to map the user connections, eliminate the large header on information packets having smaller-sized data packet sizes, and concatenating the data packets into an IPAL information packet for tunneling on the backhaul connection. In this manner, the present invention more efficiently uses the available bandwidth on the backhaul connection by selectively reducing the overhead (e.g. headers) of the information packet transmission.

40 Claims, 3 Drawing Sheets

IP ADAPTATION LAYER ON BACKHAUL CONNECTION OF CELLULAR NETWORK

TECHNICAL FIELD OF THE INVENTION

This invention relates to an improved wireless communications system and the improved method for operation on the backhaul connection between a base station controller unit and a base transceiver unit.

BACKGROUND OF THE INVENTION

A present-day mobile communication system is shown in FIG. 1 where the Public Switched Telephone Network ("PSTN") 10 is connected to a Mobile Switching Center Unit 15 via connection line 12. The Internet 20, viewed as a constituent cloud or network, is coupled to the Packet Data Service Node 24 via connection line 22. The Mobile Switching Center Unit 15 is coupled to the Base Station Controller ("BSC") Unit 19 via connection line 17, and the Packet Data Service Node 24 is coupled to the Base Station Controller Unit 19 via connection line 25.

Communications on the communication system are processed by the BSC 19 for transmission to the PSTN 10, the Internet 20, or the mobile units, sometimes called mobile nodes, shown at $MN_1$, 65, $MN_{2a}$ 75, $MN_{2b}$, 85, $MN_{2c}$ 95, $MN_3$ 105, $MN_4$ 115. For communications being transmitted to the mobile node $MN_1$ 65, the BSC 19 will transmit the communication along the backhaul connection 40 to the Basestation Transceiver Subsystem ("BTS") Unit 45. The BTS 50 is coupled to the BSC unit 19 via backhaul connection 35, and the BTS 55 is coupled to the BSC unit 19 via backhaul connection 30.

The BTS 45 will transmit the communication via a wireless communication link 60 to the mobile node $MN_1$ 65. Reciprocal communications from $MN_1$ 65 will be processed by the above-identified equipment in the reverse order described above. In this manner, the $MN_1$ 65 will be coupled to the communication system, the PSTN 10 and the Internet 20 through these connections.

Likewise, the mobile nodes $MN_{2a}$ 75, $MN_{2b}$, 85, $MN_{2c}$ 95 will be coupled to the system through BTS 50 and wireless connections 70, 80 and 90, respectively. Further, the mobile nodes $MN_3$ 105 and $MN_4$ 115 are couple to the system through BTS 55 and wireless connection 100 and 110, respectively.

The Internet and the IP Protocol

Present-day Internet communications represent the synthesis of technical developments begun in the 1960s—the development of a system to support communications between different United States military computer networks, and the subsequent development of a system to support the communication between research computer networks at United States universities. These technological developments would subsequently revolutionize the world of computing.

The Internet, like so many other high tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

Defense Department officials requested that a system be built to permit communication between these different computer networks. The Defense Department recognized, however, that a single centralized system would be vulnerable to missile attacks or sabotage. Accordingly, the Defense Department mandated that the system to be used for communication between these military computer networks be decentralized and that no critical services be concentrated in a few, vulnerable failure points. In order to achieve these goals, the Defense Department established a decentralized standard protocol for communication between network computers.

A few years later, the National Science Foundation wanted to connect network computers at various research institutions across the country. The NSF adopted the Defense Department's protocol for communication, and this combination of research computer networks would eventually evolve into the Internet.

The Defense Department's communication protocol governing data transmission between computers on different networks was called the Internet Protocol (IP) standard. The IP standard now supports communications between computers and networks on the Internet. The IP standard identifies the types of services to be provided to users, and specifies the mechanisms needed to support these services. The IP standard also describes the upper and lower system interfaces, defines the services to be provided on these interfaces, and outlines the execution environment for services needed in the system.

A transmission protocol, called the Transmission Control Protocol (TCP), was also developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

The TCP/IP Protocol

In a typical communications scenario, data is transmitted from an applications program in a first computer, through the first computer's network hardware, and across the transmission medium to the intended destination on the Internet. After receipt at a destination computer network, the data is transmitted through the destination network to a second computer. The second computer then interprets the communication using the identical protocols on a similar application program. Because of the standard protocols used in Internet communications, the TCP/IP protocol on the second computer should decode the transmitted information into the original data transmitted by the first computer.

To fully support Internet communications, the TCP/IP protocol system must perform the following tasks: (1) dividing messages into manageable chunks of data to pass efficiently through the transmission medium, (2) interfacing the network adapter hardware, (3) addressing target data to a specified computer and allowing the computer to acknowledge receipt of the data or recognize the absence of a message it was supposed to have received, and (4) routing data to a destination computer even if the source and destination computers are on different physical networks. The TCP/IP network protocol must also error check and control data flow, and TCP/IP protocol supports many important features such as logical addressing, high-level naming service, and application program support.

The TCP/IP Protocol Layers

One of the rules in TCP/IP communications is that a computer user does not need to get involved with details of data communication. In order to accomplish this goal, the TCP/IP standard imposes a layered communications system structure. All the layers are located on each computer in the network, and each module or layer is a separate component that theoretically functions independent of the other layers.

TCP/IP and its related protocols form a standardized system for defining how data should be processed, transmitted and received on the Internet. TCP/IP defines the network communication process, and more importantly, defines how a unit of data should look and what information the message should contain so that the receiving computer can interpret the message correctly. Because the standardized layer design of TCP/IP, a consistent conversion of base data is ensured regardless of the version or vendor of the TCP/IP conversion software.

The TCP/IP protocol suite is the interface between the application programs on the computer and the data communication hardware. Each layer is responsible for a separate task or routine in the network communication. The Protocol Layers for the TCP/IP and the OSI Protocol Layers are identified in Table I.

TABLE I

| Protocol Layer | Protocol Layers for TCP/IP | Protocol Layer (OSI) |
|---|---|---|
| 7 | Network | Application |
| 6 | Applications | Presentation |
| 5 |  | Session |
| 4 | TCP/UDP | Transport |
| 3 | IP | Network |
| 2 | Data Link | Data Link |
| 1 | Physical | Physical |

When the first computer transmits a data message to a second computer on the Internet - either sending a message or requesting information—the TCP/IP Protocol Layers in the first computer prepare the based data for transmission to a second computer by adding additional information to the based data. New pieces of information (e.g. headers) are added to the data as the base data descends through each layer in the protocol. After processing, the base data with various headers will form a fully structure datagram under the TCP/IP protocol.

After the base data has been processed by all the layers in the protocol, it is ready for transmission across the Internet to the second computer. The datagram is transmitted on the Internet and should be received by the intended destination computer. For the second computer to interprete the incoming data, the same set of TCP/IP protocol layers are used by the second computer—only in reverse order. As the transmitted information ascends through the protocol layers in the second computer, each protocol level strips away the added information (e.g. headers) to leave the base data in the applications program of the second computer.

In the OSI model, the Application Layer (level 7) supports the transfer of information that is specific to the computer program being run by a user. Some application-layer protocols define how electronic mail is to be exchanged, while other Application Layer protocols define how files are to be transferred from one computer to another or how World Wide Web pages are to be fetched by a server from a browser page.

The Presentation Layer (level 6) in the OSI model defines the syntax and semantics of the information being exchanged by an applications program. This means that the presentation-layer protocol defines how the integers, text messages, and other data of an application program are to be encoded and transmitted over the network. This layer supports computers using different types of hardware and operating systems thereby allowing all computers to exchange information with lower protocol layers regardless of their particular method of storing or processing data.

The Session Layer (level 5) delivers a stream of data to the Transport Layer based upon the application-oriented tasks being performed in the higher level layers. Some Session Layer protocols provide periodic checkpoints allowing resumption of a communication in the event of a catastrophic network failure. In real world environments, the Application, Presentation, and Session Layers (Levels 5, 6 and 7) may be viewed as a single layer called the Application Layer.

The Transport Layer (level 4) is responsible for preparing the data for packet transmission on the Network Layer. The Transport Layer protocol defines the methods for detecting errors in a transmission of segments and for correcting these errors. The Transport Layer often uses the TCP protocol because it has a high degree of reliability and error checking capabilities. The Transport Layer could also use the UDP protocol, which is a simple interface to the Network Layer. While quicker than the TCP protocol, the UDP does not necessarily provide for increased reliability in data transmission.

In the OSI model, the Network Layer provides the interface between the physical network defined by Layers 1 and 2 (the Data Link Layer and the Physical Layer) and the higher-level protocol levels defined by Layers 4–7 (the Transport, Session, Presentation and Application Layers). The Network Layer uses the frame transmission facility provided by the Data Link Layer to move data packets from their original source to their ultimate destination on the Internet.

The Network Layer supports the key TCP/IP protocols for logical addressing and routing of data. According to the IP protocol, the Network Layer formats data and addresses the data for transmission to the destination network or sub-network based on physical hardware addresses. The Network Layer protocol also defines how network devices discover the existence of other network devices and computers, and how packets find their final destination. The Network Layer also provides error checking for data delivered on the physical network.

The Data Link Layer (Level 2) provides an interface with the network adapter and maintains logical links for the network. The Data Link Layer also uses the raw bit transmission facility provided by the Physical Layer to move frames of data from one computer to neighboring computers on the same network or sub-network. The Data Link Layer protocol defines methods for ensuring the reliability of each data frame and also arbitrates access to those media types that are shared by many computers.

The Physical Layer (Level 1) moves raw data bits across a Communication medium. A Physical Layer defines the electrical and mechanical characteristics of the communication media, the bit rate, the voltages, and any other parameter necessary for communication of raw data bits on the communication system. The Physical Layer converts the data stream comprising electric or analog signals and oversees the transmission of data thereon.

Tasks performed in protocol layers 2 and 3 play an important role in interfacing the high-level application program levels with the physical communications network levels. By design, the tasks performed on these lower level protocols are automated because they operate on low-level data structures and these low-level tasks control the physical hardware on the communications system. These lower level layers operate virtually by themselves with no direct user interaction or control—primarily so as to not trouble the computer user with the details of data bit transfer or routing path determinations.

SUMMARY OF THE INVENTION

The present-day wireless communications system handles different size information packets transmitted at different frequency transmission rates. While the size, type, and frequency of transmissions may vary on the wireless communications system, a protocol header (usually 40 bytes for the TCP/IP packet) is present on all communications on the backhaul connection from the BSC 19 to the BTS 45, 50, or 55. For larger-sized information packets and infrequently delivered information packets, the large header size will not affect the overall efficiency performance of the system. For smaller-sized data packets (e.g. 10 to 20 byte length) that are frequently delivered (e.g. every 10 to 20 msec. for voice communications), however, this protocol header length will be disproportionally large compared to the data packet size, thereby occupying a larger than normal amount of bandwidth on the backhaul connection.

It is therefore an objective of the present invention to optimize the transmission of information packets on the backhaul connection between the base station controller unit 19 (BSC) and the basestation transceiver subsystem units (BTS) 45, 50 or 55. The present invention accomplishes this goal by using an IP Adaptation Layer protocol to map the user connections, eliminate the TCP/IP header on smaller-sized, frequent information packet transmission, and concatenating the data in the information packet in a multiple string for tunneling between the BSC 19 unit and the BTS 45, 50, 55 units. In this manner, the present invention more efficiently uses the available bandwidth on the backhaul connection between the BSC 19 unit and the BTS 45, 50, 55 units by reducing the overhead (e.g. headers) of the information packet transmission.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
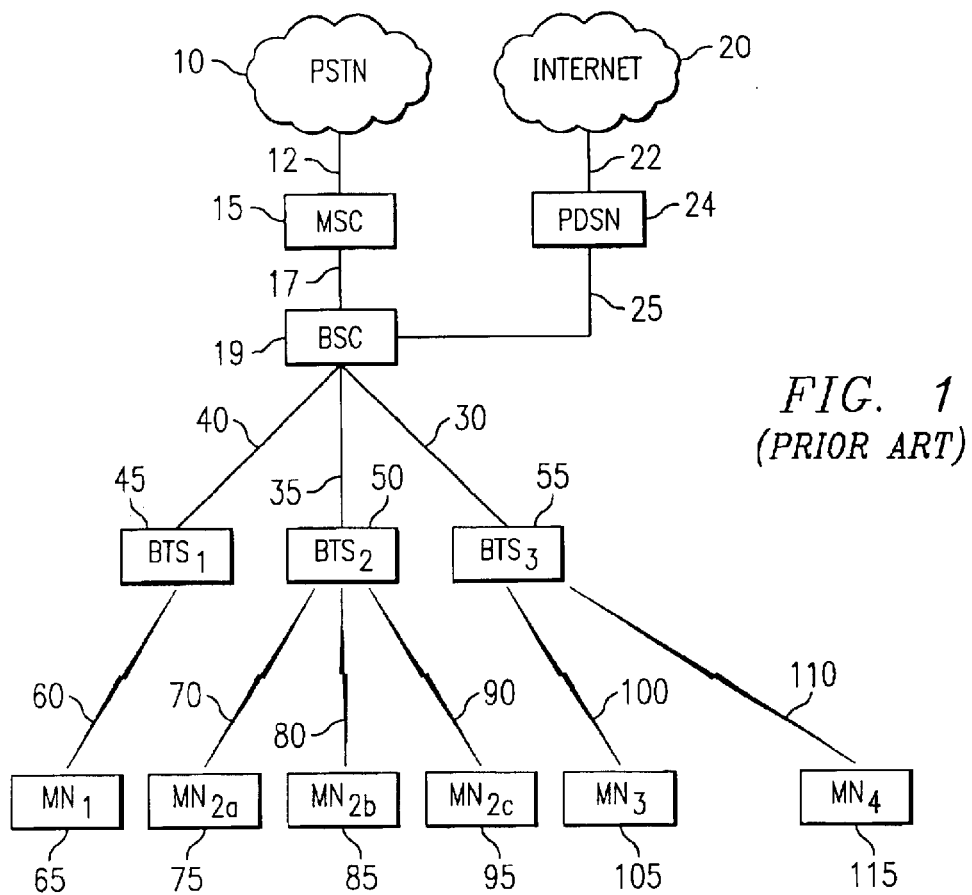
FIG. 1 is a schematic diagram of the prior art wireless communications system.

A wireless communications system is shown in FIG. 1 where the Public Switched Telephone Network ("PSTN") 10 is connected to a Mobile Switching Center Unit 15 via connection line. 12. The Internet 20, viewed as a constituent cloud or network, is coupled to the Packet Data Service Node 24 via connection line 22. The Mobile Switching Center Unit 15 is coupled to the Base Station Controller ("BSC") Unit 19 via connection line 17, and the Packet Data Service Node 24 is coupled to the Base Station Controller Unit 19 via connection line 25.

Communications on the communication system are processed by the BSC 19 for transmission to the PSTN 10, the Internet 20, or the mobile units, sometimes called mobile nodes, shown at $MN_1$ 65, $MN_{2a}$ 75, $MN_{2b}$ 85, $MN_{2c}$ 95, $MN_3$ 105, $MN_4$ 115. For communications being transmitted to the mobile node $MN_1$ 65, the BSC 19 will transmit the communication along the backhaul connection 40 to the Basestation Transceiver Subsystem ("BTS") Unit 45. The BTS 50 is coupled to the BSC unit 19 via backhaul connection 35, and the BTS 55 is coupled to the BSC unit 19 via backhaul connection 30.

The BTS 45 will transmit the communication via a wireless communication link 60 to the mobile node $MN_1$ 65. Reciprocal communications from $MN_1$ 65 will be processed by the above-identified equipment in the reverse order described above. In this manner, the $MN_1$ 65 will be coupled to the communication system, the PSTN 10 and the Internet 20 through these connections.

Likewise, the mobile nodes $MN_{2a}$ 75, $MN_{2b}$ 85, $MN_{2c}$ 95 will be coupled to the system through BTS 50 and wireless connections 70, 80 and 90, respectively. Further, the mobile nodes $MN_3$ 105 and $MN_4$ 115 are coupled to the system through BTS 55 and wireless connections 100 and 110, respectively.

A protocol header (usually 40 bytes for TCP/IP) is present on all communications on the backhaul connection from the BSC 19 to the BTS 45, 50, or 55. For larger-sized information packets and infrequently delivered information packets, the large protocol header size will not affect the overall efficiency performance of the system. For smaller-sized data packets (e.g. 10 to 20 byte length) that are frequently delivered (e.g. every 10 to 20 msec. for voice communications), however, the protocol length will be disproportionally large compared to the data packet size, thereby occupying a larger than normal amount of bandwidth on the backhaul connection.

Figure 2:
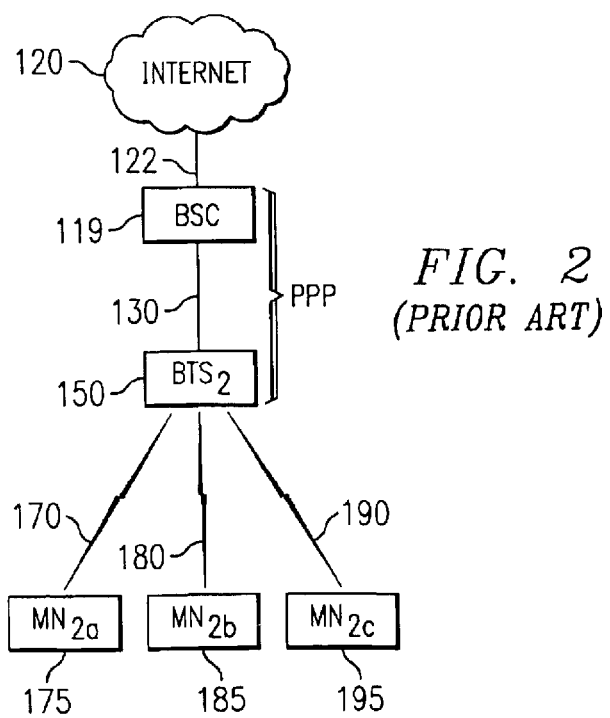
FIG. 2 is a schematic diagram of the backhaul connection using a Point-to-Point ("PPP") connection.

One proposed prior art solution to the problem of a disproportionally large overhead of the backhaul connection is shown in FIG. 2 where the backhaul BSC/BTS connection is shown. The Internet 120 is coupled to the BSC 119 via communication link 122. The backhaul connection 130 is located between the BSC 119 and the BTS 150. The mobile nodes $MN_{2a}$ 175, $MN_{2b}$ 185, $MN_{2C}$ 195 will be coupled to the system through BTS 150 and wireless connections 170, 180 and 190, respectively.

In this solution, all communications between the BSC 119 and the BTS 150 will be placed in a Point-to-Point ("PPP") formatted multiplexed packet for transmission. The PPP formatting protocol would essentially add an additional protocol layer below the IP layer as shown in Table II.

TABLE II

| Protocol Layer | User 1 | User 2 |
|---|---|---|
| 7 | Network Applications | Network Applications |
| 6 | Network Applications | Network Applications |
| 5 | | |
| 4 | TCP/UDP | TCP/UDP |
| 3 | IP | IP |
| PPP | Mux PPP Layer | |
| 2 | DataLink | DataLink |
| 1 | Physical | Physical |

The PPP multiplexing protocol will be conducted regardless of information packet size or transmission frequency. Thus, for small data sizes in the information packet, the PPP multiplexing may be effective. But, for the larger data sizes in the information packet sizes in the information packet, the PPP multiplexing may not be necessary. Under this proposed PPP protocol solution, it will be performed anyway. Further, the PPP multiplexing adds an additional sub-layer that may not be compatible with the preexisting equipment used in the backhaul BSC/BTS connection. As such, this PPP formatting protocol is not an efficient, or effective, solution to the backhaul communications problem.

Figure 3:
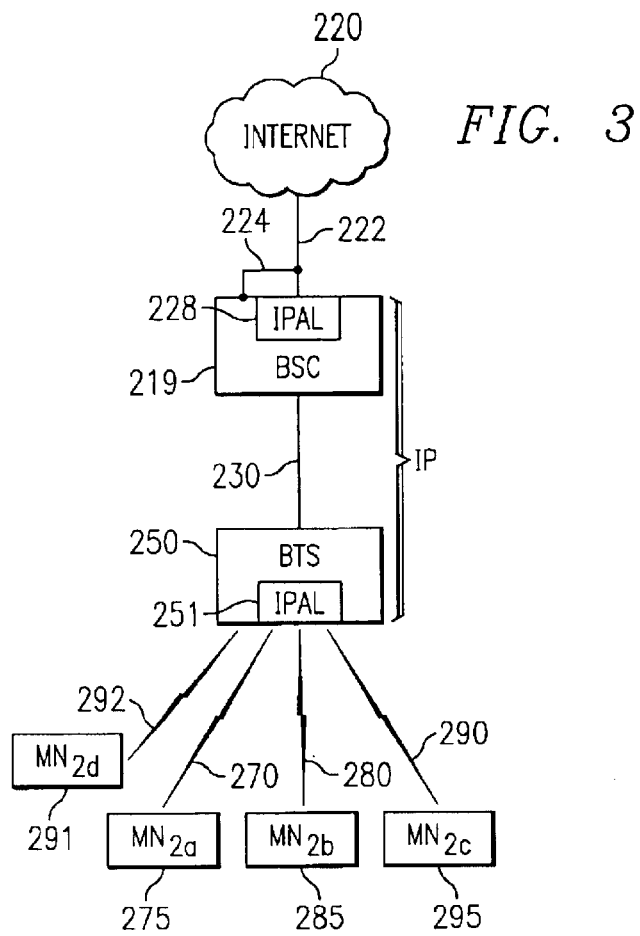
FIG. 3 is a schematic diagram of the backhaul connection using the IPAL interface on certain transmissions.

As shown in FIG. 3, the present invention is shown using a similar representation of the backhaul BSC/BTS connection. The Internet 220 is selectively coupled to the BSC 219 via communication link 222 through an IP Adaptation Layer (IPAL) 228. The backhaul connection 230 is located between the BSC 219 and the BTS 250. The mobile nodes $MN_{2a}$ 275, $MN_{2b}$ 285, $MN_{2c}$ 295 will be coupled to the BSC 219 through backhaul connection 230, BTS 250, IPAL 251, and wireless connections 270, 280 and 290, respectively. After the communication is transmitted through the backhaul connection 230, the BTS 250 transmits the communications on wireless communications 270, 280 and 290 through the IPAL 251. This IPAL layer 251 will perform reciprocal operations to the IPAL 228 in order to retrieve the appropriate data for transmission to the mobile nodes.

Some connections to the BSC 219, like control signal transmissions and large size information packets, are coupled to the BSC directly through the connection 224. These direct connections will be used for transmission of information packets to mobile nodes, such as $MN_{2d}$ 291, without modification of the information packet under the present invention. The direct connection to the mobile node $MN_{2d}$ 291 can be traced via backhaul communication link 230, BTS 250, and wireles communication link 292, respectively. These direct connections to $MN_{2d}$ 291 will not utilize the IPAL 228 or 251 protocols.

In the preferred embodiment, the IPAL 228 and 251 applications will be an additional protocol layer located above the IP layer for select users (e.g. smaller-sized data packets, frequently transmitted) and capable of using compatible equipment already being used in the BTS, as shown in Table III.

TABLE III

| Protocol Layer | User 1 | User 2 | User 3 |
|---|---|---|---|
| 7 | Network Applications | Network Applications | Network Applications |
| 6 | | | |
| 5 | | | |
| 4 | TCP/UDP IPAL | TCP/UDP IPAL | TCP/UDP |
| 3 | IP | IP | IP |
| 2 | Data Link | Data Link | Data Link |
| 1 | Physical | Physical | Physical |

The IP Adaptation Layer (IPAL) will map suitable connections for nodes that will transmit smaller size data packets frequently over the communication system, like telephone voice or VoIP users, when the connections are initially set up. The IPAL connections will be mapped to a mapping table in the IPAL 228 located in BSC 219 and the IPAL 251 located in BTS 250 during the initial set-up of the connection, and with the information regarding the type of connection that will be maintained.

The selectivity of the present invention can be seen in Table III where Users 1 and 2 are suitable users (e.g. small packet sizes transmitted frequently on system), and the IPAL 228 and 251 application will implement. In this context, User 3 may not be a suitable IPAL user because the user may transmit infrequently or only transmit large size information packets. The IPAL 228 will selectively use the present invention on certain types of communications thereby allowing non-suitable communications to be transmitted without modification.

Accordingly, the use of the present invention will provide the flexibility where the invention is needed—on the frequently-transmitted smaller data-sized information packets (e.g. VOIP, telephone voice calls)—and the present invention will not burden the system with unnecessary protocols for information packets not suited for the IPAL protocol. Further, the present invention will use pre-existing equipment that is compatible equipment already used on the ATM-based BSC 219 and BTS 250 units.

Figure 4:
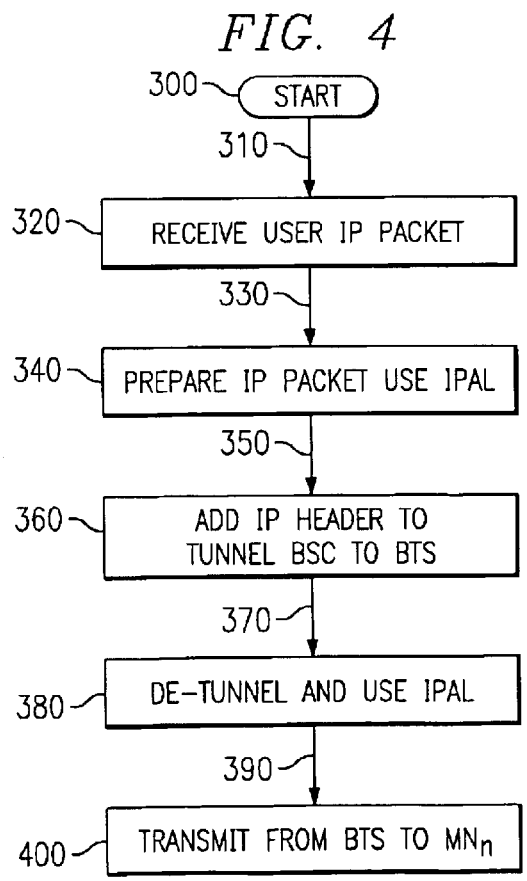
FIG. 4 is a flow chart representation of the steps in the transmission of an information packet in the present invention; and, FIG. 5 is a representation of information packet for individual users.

The IPAL protocol for the present invention is shown in FIG. 4 where the protocol starts at step 300 where the initialization and set-up mapping procedures are implemented for each new connection. In step 300, the IP Adaptation Layer (IPAL) will map suitable connections for nodes that will transmit smaller size data packets frequently over the communication system, like telephone voice or VoIP users. Further, the IPAL connections will be mapped to a mapping table in the IPAL 228 located in BSC 219 and the IPAL 251 located in BTS 250, and the information regarding the type of connection that will be maintained.

After step 300, the protocol proceeds to step 320. In step 320, the unit operating the IPAL protocol, either the BSC 219 or the BTS 250, receives the user information packets having the TCP/IP or UDP/IP header. The IPAL 228 or 251 will be performed in the BSC 219 or BTS 250, respectively.

Figure 5:
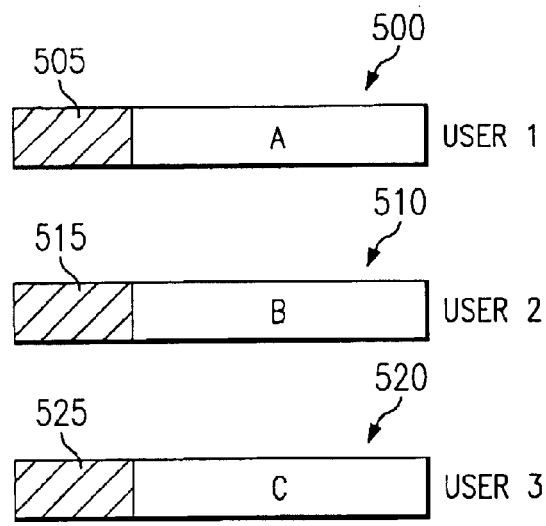

Three user information packets are shown in FIG. 5. The User 1 information packet has data packet designated by the "A" and the TCP/IP or UDP/IP header 505. Also shown in FIG. 5 is the User 2 information packet that has data packet designated by the "B" and the TCP/IP or UDP/IP header 515, and the User 3 information packet that has data packet designated by the "C" and the TCP/IP or UDP/IP header 525.

Figure 8:
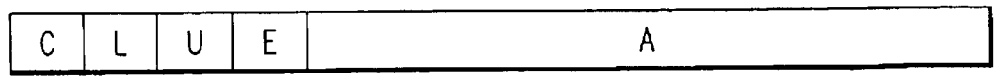
FIG. 8 is a representation of the smaller IPAL data packet header with data packet payload "A".

The IPAL protocol proceeds to the step 340 where the protocol will prepare several user information packets for transmission. At step 340, the TCP/IP or UDP/IP header will be removed from each user information packet, and a smaller IPAL data packet header will be appended to each data packet. As shown in FIG. 8, the smaller IPAL data packet header can be a 3 octet CPS header that is compatible with the headers used in the ATM adaptation layer, and therefore compatible with the ATM equipment present in the BSC 219 and the BTS 250. Further, the smaller IPAL data packet header attached to the data packet payload (designated as "A" in FIG. 8) can include a Channel ID value with 248 values (designated as "C" in FIG. 8), a Length Indicator identifying the length of the IPAL data packet payload (designated as "L" in FIG. 8), a User-User Indicator available to the SSCS and layer management entities to convey management and control signals (designated as "U" in FIG. 8), and an error control indicator (designated as "E" in FIG. 8) for error detection.

In an alternative embodiment, the length indicator can be defined in the same manner as other adaptation layer protocols, or as an alternative embodiment, the length indication may be set to all "11111s" to indicate a long data packet payload. The receiving IPAL would have to read the first two octets of extra information in the data packet payload to determine length, etc.

Figure 6:
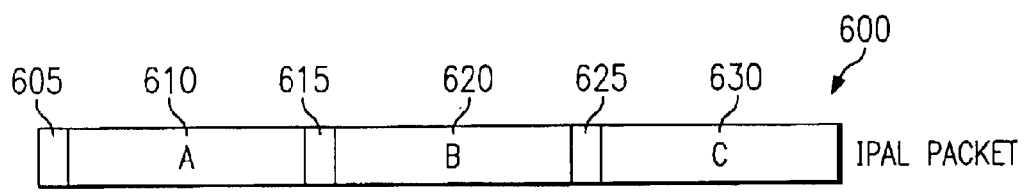
FIG. 6 is a representation of a concatenated series of data in the information packets after IPAL operation.

In step 340, several data packets will be concatenated into a larger IPAL packet. This type of concatenated IPAL packet 600 is shown in FIG. 6 where the data from user information packet 500, data packet "A", is placed in the IPAL packet 600 at location 610 with a smaller header 605. The data from user information packet 510, data packet "B", is placed in the IPAL packet 600 at location 620 with a smaller header 615. The data from user information packet 520, data packet "C", is placed in the IPAL packet 600 at location 630 with a smaller header 625. During the processing step 340, the IPAL protocol will concatenate the data packet payloads into a single sting based upon a mapping IPAL table set up when the connections were initially made by the MN user.

Figure 7:
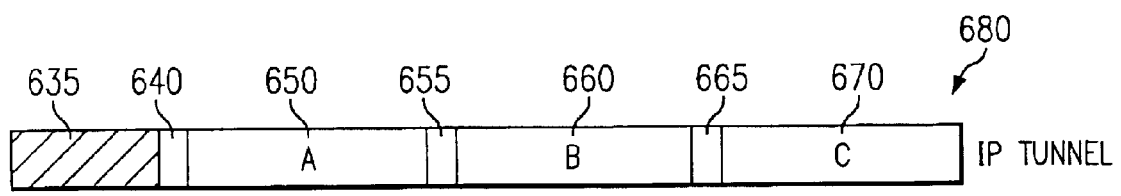
FIG. 7 is a representation of the information packet to be tunneled between the BSC and the BTS units.

The IPAL protocol proceeds to the step 360 where the IPAL packet 600 has a single IP header 635, as shown in FIG. 7, added to the IPAL packet 680 for tunneling the IPAL packet between the BSC/BTS backhaul connection. The constituent parts of the IPAL packet 680, such as smaller IPAL headers 640, 655 and 665 correspond to headers 605, 615 and 625 in IPAL packet 600 FIG. 6. Further, the constituent data parts of the IPAL packet 680, such as the IPAL data packets 610, 620 and 630 correspond to headers 650, 660 and 670 in IPAL packet 600 FIG. 6. After the IP header 635 is placed on the IPAL packet 680, the IPAL packet is tunneled across the BSC/BTS backhaul connection.

The IPAL protocol proceeds from step 360 to step 380 where the IPAL packet 680 is de-tunneled, or de-processed, using the reciprocal steps in the corresponding IPAL subsystem. According to the deprocessing steps, the IPAL packet 680 is separated from the IP header 635 resulting in the IPAL packet 600. The IPAL data packet payload in the IPAL packet 600 are separated into the individual user data packet shown in "A" of information packet 500, "B" of information packet 510, and "C" of information packet 520. After de-processing in step 380, the IPAL protocol will proceed to step 400 where the data packet payloads will be distributed to the correct corresponding mobile node based upon a mapping IPAL table set up when the connections were initially made by the MN user.

In this manner, the present invention accommodates the objectives of the invention by reducing large overhead header from certain transmissions on the backhaul connection in a flexible solution that is compatible with current equipment specifications. While the invention has been particularly shown and described with respect to preferred embodiments, it will be readily understood that minor changes in the details of the invention may be made without departing from the spirit of the invention. Having described the invention, we claim:

What is claimed is:

1. A method for communicating to a mobile node on a communications system having a base station controller unit and a basestation transceiver subsystem unit coupled by a backhaul connection, comprising the steps of:
   receiving a plurality of user information packets each having a data packet for transmission from the base station controller unit;
   selecting data packets from the plurality of user information packets to be transmitted across the backhaul connection, said selected data packets having approximately 20 bytes or less of data payload that are to be transmitted across the backhaul connection;
   preparing an adaptation layer information packet from the selected data packets in the plurality of user information packets; and
   tunneling the adaptation layer information packet from the base station controller unit through the backhaul connection, which is a dedicated connection between the base station controller unit and the basestation transceiver subsystem unit.

2. The method for communicating to a mobile node in claim 1 wherein the selected data packets used in the preparation of the adaptation layer information packet include data packets that are smaller in size than the header of the user information packet.

3. The method for communicating to a mobile node in claim 1 wherein the selected data packets used in the preparation of the adaptation layer information packet includes data packets that are frequently transmitted from the base station controller unit.

4. The method for communicating to a mobile node in claim 3 wherein the selected data packets used in the preparation of the adaptation layer information packet include data packets that are smaller in size than the header of the user information packet.

5. The method for communicating to a mobile node in claim 1 wherein preparing the adaptation layer information packet includes adding a small header to each data packet.

6. The method for communicating to a mobile node in claim 5 wherein the small header includes a channel identification value.

7. The method for communicating to a mobile node in claim 5 wherein the small header includes a length indicator value.

8. The method for communicating to a mobile node in claim 5 wherein the small header includes a user control value.

9. The method for communicating to a mobile node in claim 5 wherein the small header includes an error control value.

10. The method for communicating to a mobile node in claim 1 wherein preparing the adaptation layer information packet includes concatenating multiple data packets into the adaptation layer information packet.

11. The method for communicating to a mobile node in claim 10 wherein preparing the adaptation layer information packet includes adding an IP header to the adaptation layer information packet.

12. The method for communicating to a mobile node in claim 1 further comprising the step of:
   deprocessing the adaptation layer information packet after receiving the adaption layer information packet at a base transceiver station coupled to the base station controller unit.

13. The method for communicating to a mobile node in claim 12 wherein deprocessing the adaptation layer information packet includes removal of the IP header adaptation layer information packet.

14. The method for communicating to a mobile node in claim 12 wherein deprocessing the adaptation layer information packet includes separating each data packet from the adaptation layer information packet for transmission to the mobile mode.

15. A method for communicating to a mobile node on a communications system having a base station controller unit, comprising the steps of:
   receiving a plurality of user information packets each having a data packet for transmission from the base station controller unit over the backhaul connection to a basestation transceiver subsystem unit;
   selecting data packets having approximately 20 bytes or less of data payload from all the information packets to be transmitted across the backhaul connection;
   preparing an adaptation layer information packet using the adaptation layer protocol from the selected data packets in the plurality of user information packets including concatenation of multiple selected data packets into the adaptation layer information packet and adding an IP header to the adaptation layer information packet; and
   tunneling the adaptation layer information packet from the base station controller unit over the backhaul connection to a basestation transceiver subsystem unit.

16. The method for communicating to a mobile node in claim 15 wherein the selected data packets used in the preparation of the adaptation layer information packet include data packets that are smaller in size than the header of the user information packet.

17. The method for communicating to a mobile node in claim 15 wherein the selected data packets used in the preparation of the adaptation layer information packet includes data packets that are frequently transmitted from the base station controller unit.

18. The method for communicating to a mobile node in claim 17 wherein the selected data packets used in the preparation of the adaptation layer information packet include data packets that are smaller in size than the header of the user information packet.

19. The method for communicating to a mobile node in claim 15 wherein preparing the adaptation layer information packet includes adding a small header to each data packet.

20. The method for communicating to a mobile node in claim 19 wherein the small header includes a channel identification value.

21. The method for communicating to a mobile node in claim 19 wherein the small header includes a length indicator value.

22. The method for communicating to a mobile node in claim 19 wherein the small header includes a user control value.

23. The method for communicating to a mobile node in claim 19 wherein the small header includes an error control value.

24. The method for communicating to a mobile node in claim 15 further comprising the step of:

deprocessing the adaptation layer information packet after receiving the adaptation layer information packet at a base transceiver station coupled to the base station controller unit.

25. The method for communicating to a mobile node in claim 24 wherein deprocessing the adaptation layer information packet includes removal of the IP header from the adaptation layer information packet.

26. The method for communicating to a mobile node in claim 24 wherein deprocessing the adaptation layer information packet includes separating each data packet from the adaptation layer information packet for transmission to the mobile node.

27. A system for communicating to a mobile node in a wireless communications network comprising:

a base station controller unit coupled to a telecommunications network;

a basestation transceiver subsystem unit coupled to the base station controller unit by a dedicated backhaul connection, said basestation transceiver subsystem unit capable of communicating with the mobile node on the communications network;

wherein the base station controller unit receives a plurality of user information packets each having a data packet for transmission from the base station controller unit and prepares an adaptation layer information packet from selected data packets in the plurality of user information packets for subsequent tunneling to the basestation transceiver subsystem unit over the backhaul connection; and said base station controller unit only selects data packets from all the information packets to transmit over the backhaul connection having approximately less than 20 bytes of data payload to concatenate to form said adapatation layer information packet.

28. The communication system in claim 27 wherein the selected data packets used in the preparation of the adaptation layer information packet include data packets that are smaller in size than the header of the user information packet.

29. The communication system in claim 27 wherein the selected data packets used in the preparation of the adaptation layer information packet includes data packets that are frequently transmitted from the base station controller unit.

30. The communication system in claim 29 wherein the selected data packets used in the preparation of the adaptation layer information packet include data packets that are smaller in size than the header of the user information packet.

31. The communication system in claim 27 wherein the base station controller unit prepares the adaptation layer information packet by adding a small header to each data packet.

32. The communication system in claim 31 wherein the small header includes a channel identification value.

33. The communication system in claim 31 wherein the small header includes a length indicator value.

34. The communication system in claim 31 wherein the small header includes a user control value.

35. The communication system in claim 31 wherein the small header includes an error control value.

36. The communication system in claim 27 wherein the base station controller unit prepares the adaptation layer information packet by concatenating multiple data packets addressed to different mobile nodes.

37. The communication system in claim 27 wherein the base station controller unit prepares the adaptation layer information packet by adding an IP header to the adaptation layer information packet.

38. The communication system in claim 27 wherein the base transceiver station unit will deprocess the adaptation layer information packet after receiving the adaptation layer information packet at a base transceiver station.

39. The communication system in claim 38 wherein the base transceiver station unit will deprocess the adaptation layer information packet by removing the IP header from the adaptation layer information packet.

40. The communication system in claim 38 wherein the base transceiver station unit will deprocess the adaptation layer information packet by separating each data packet from the adaptation layer information packet for transmission to the mobile node.

* * * * *